INVENTORS.
CLAUDE LOESCH
LEO J LOESCH
BY Andrus & Starke
Attorneys

Sept. 13, 1966 L. J. LOESCH ET AL 3,272,355
METHOD AND APPARATUS FOR UNLOADING SILAGE
Filed Dec. 2, 1964 4 Sheets-Sheet 3

INVENTORS
CLAUDE LOESCH
LEO J. LOESCH
BY Andrus & Starke
Attorneys

INVENTORS.
CLAUDE LOESCH
LEO J. LOESCH
BY Andrus & Starke
Attorneys 3,272,355
METHOD AND APPARATUS FOR
UNLOADING SILAGE
Leo J. Loesch and Claude E. Loesch, both of
Rte. 1, Kimball, Minn.
Filed Dec. 2, 1964, Ser. No. 418,370
15 Claims. (Cl. 214—17)

This invention relates to a silo unloader and more particularly to an improved mechanism for dislodging the stored material and discharging it to the exterior of the silo and is a continuation-in-part of application Serial No. 315,241, filed October 10, 1963, and entitled, Silo Unloader, now abandoned.

The conventional silo unloader rests on the top of the silage in the silo and includes a stationary frame which is suspended from a support resting on the top edge of the silo. A silage collecting member or cutter arm is journaled on the stationary frame and rotates about the center of the silo to cut or dislodge the silage and move it toward the center of the silo. The dislodged silage is then discharged laterally from the silo by a discharge or conveying mechanism.

The rotating cutter arm in many cases utilizes an auger to dislodge and convey the silage to the center of the silo. Generally, the auger will include a series of knives which are positioned on the outer edge of the spiral flighting and slice through the silage, with the flighting then conveying the dislodged silage to the center of the silo where it is discharged to the exterior. In the normal silo unloader, the auger will rotate about its axis at a speed in the neighborhood of 200 to 250 r.p.m. and with a standard 9 inch O.D. auger, this results in a peripheral speed in the range of about 460 to 585 feet per minute.

The present invention is directed to an improved, high-capacity silo unloader which utilizes a high speed rotating member having angular blades for dislodging the silage and throwing the dislodged silage toward the center of the silo where it is discharged to the exterior by a discharge mechanism. More specifically, the silo unloader includes a stationary frame and an auger is supported by the frame and rotates about the center of the silo. The auger is enclosed by a hood which tapers or slopes upwardly from the outer end of the auger to the center of the silo, and the inner end of the hood is secured around the central opening in a centrifugal thrower which is journaled in the frame at the center of the silo.

As the auger rotates about the center of the silo, the auger is also rotated about its own axis at a very high speed, usually above 1000 r.p.m. and generally in the neighborhood of about 1750 r.p.m. to provide a peripheral speed in excess of 2000 feet per minute. This high speed auger flighting serves to shred or slice the silage and propels the shredded silage in the form of a fast moving stream beneath the top surface of the hood to the thrower where it is discharged to the exterior.

Due to the very high operating speed of the auger, the silage is shredded or sliced so that the silage being discharged from the silo will have a more uniform size or consistency with very few lumps or larger sized particles.

As an added advantage, the capacity or output per unit weight is substantially greater than that of the conventional silo unloader, and the high speed auger can more effectively shred and dislodge frozen or hard packed silage, as well as long fibrous materials which may be present in some forms of grass silage.

By virtue of the high speed of the auger, the auger can take a smaller bite of silage and can rotate around the silo at a faster rate than the conventional cutter arm. As the bite is smaller, the power requirement to push or rotate the silo unloader within the silo is substantially reduced. Thus, the capacity or output of the unloader per unit of input power is substantially greater than that of the conventional silo unloader.

Other objects and advantages will appear in the course of the following description.

The drawings illustrate the best mode presently contemplated of carrying out the invention.

Figure 1:
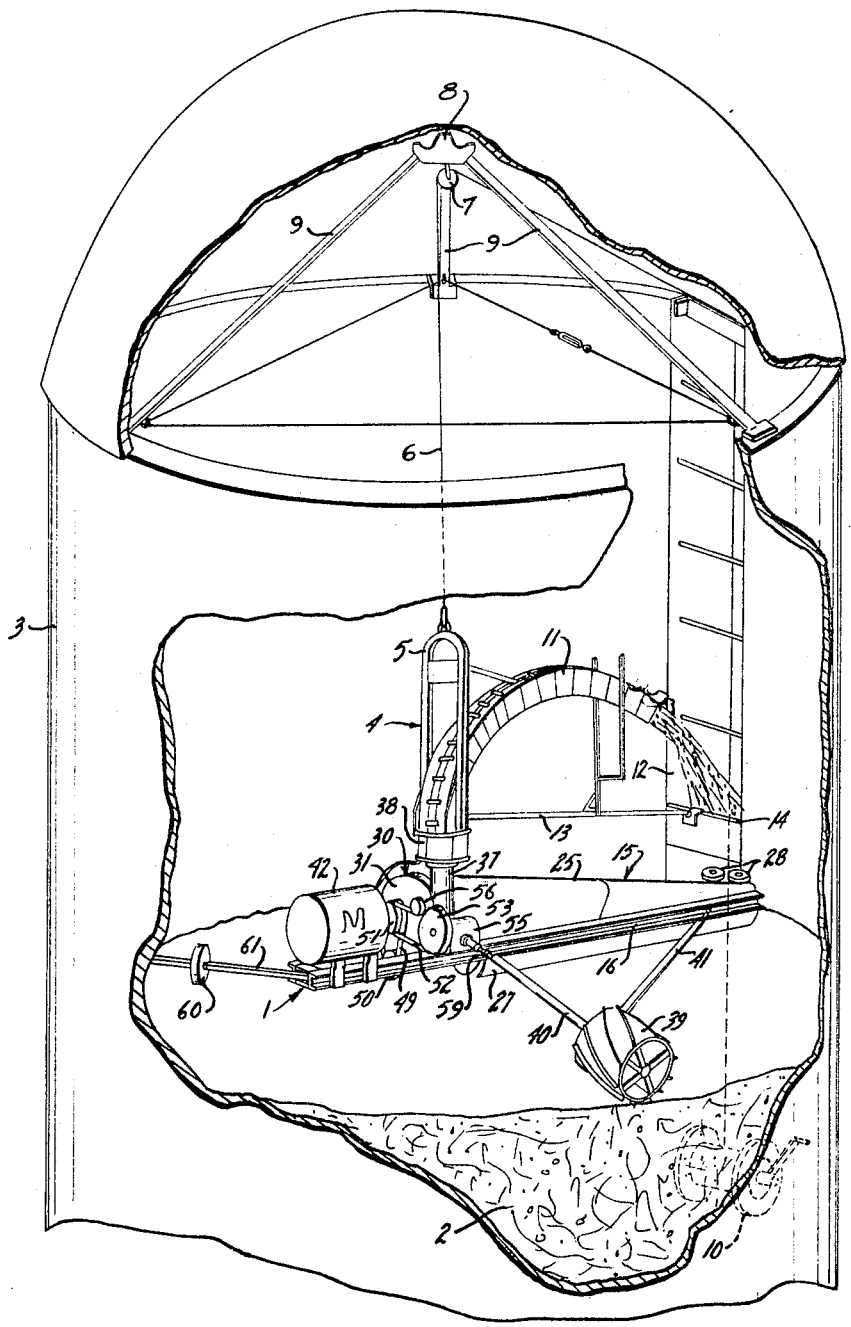
FIG. 1 is a perspective view with parts broken away showing the silo unloader of the invention in a silo.

The drawings illustrate a silo unloader 1 which is adapted to unload a stored material 2, such as silage, from a silo 3 or other storage structure.

The silo unloader 1 includes a stationary frame 4 including a yoke 5 which is suspended from a cable 6. The cable 6 is trained over a pulley 7 carried by the central connecting member 8 of a tripod support 9, which rests on the upper edge of the silo 1. The cable 6 extends radially from pulley 7 and then downwardly along the outside of the silo wall and is connected to a winch 10. By manually rotating the winch 10, the silo unloader 1 can be raised or lowered within the silo.

The stationary frame 4 also includes a flexible silage discharge chute 11 which is secured between the arms of the yoke 4 and extends laterally to a location adjacent the silo wall. The chute 11 is adapted to direct the silage through the opening 12 in the silo wall.

The stationary frame 4 is prevented from rotating within the silo 1 by a telescopic torque arm 13 which extends outwardly from the frame and engages one of a series of rungs 14 which extend across the opening 12 in the silo wall.

The silage is dislodged from the silo and conveyed to the center of the silo by a rotating cutter arm assembly 15 which is journalled for rotation about the center of the silo. The cutter arm assembly 15 includes a pair of spaced channel members 16 which extend from a position adjacent the silo wall to a position beyond the center of the silo. An auger 17 is located between the spaced channel 16 and the outer end of the auger shaft 18 is journalled within a bearing 19 connected by plate 20 to the channels 16. The inner end of the auger shaft 18 is similarly journalled in a bearing 21 attached by means of plate 22 to the channels 16.

To cut the silage located adjacent the silo wall, the outer end of the auger shaft 18 is provided with a wheel 23, and a series of knives 24 are secured to the wheel and rotate in a plane adjacent to the silo wall to cut the silage up to the wall.

Figure 2:
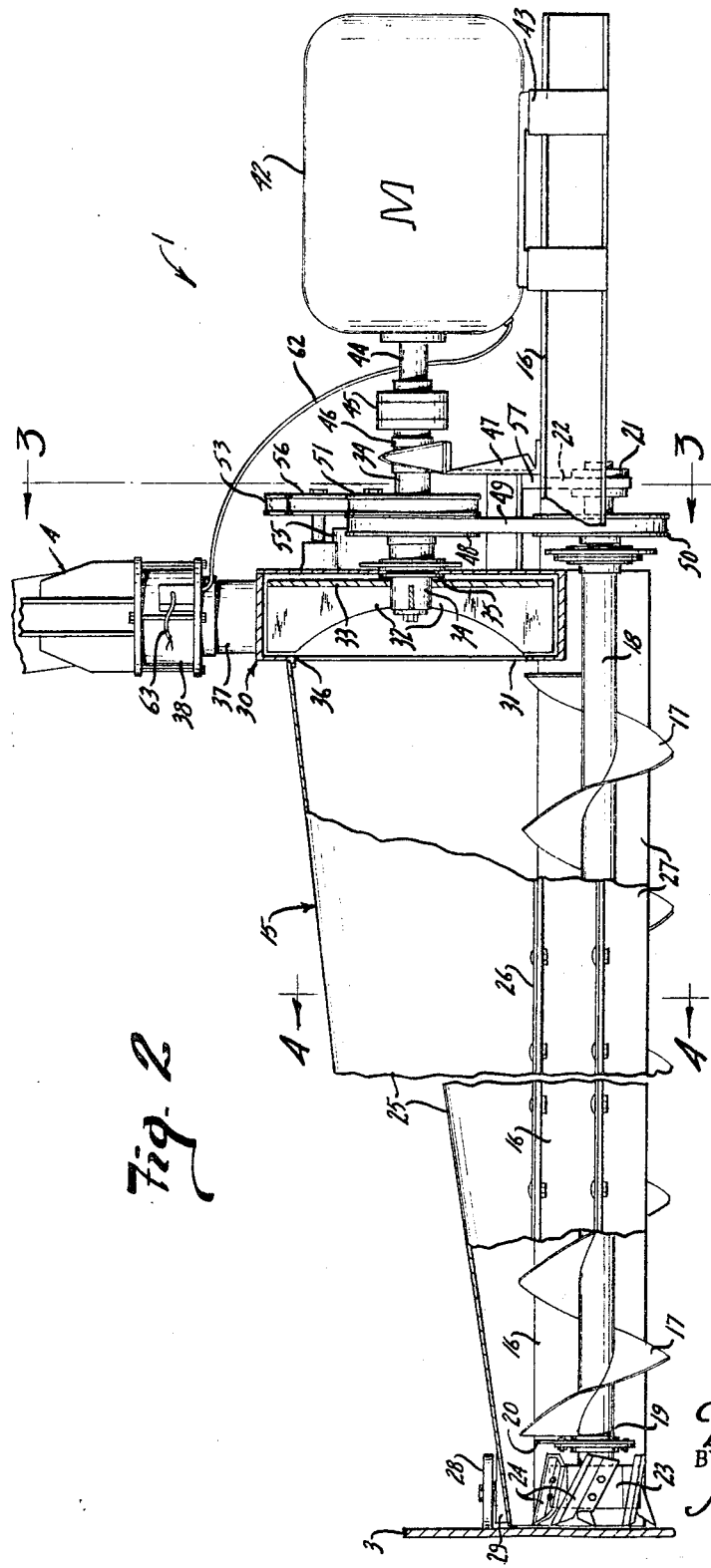
FIG. 2 is a longitudinal section with parts broken away showing the rotating silage gathering arm of the silo unloader.
Figure 3:
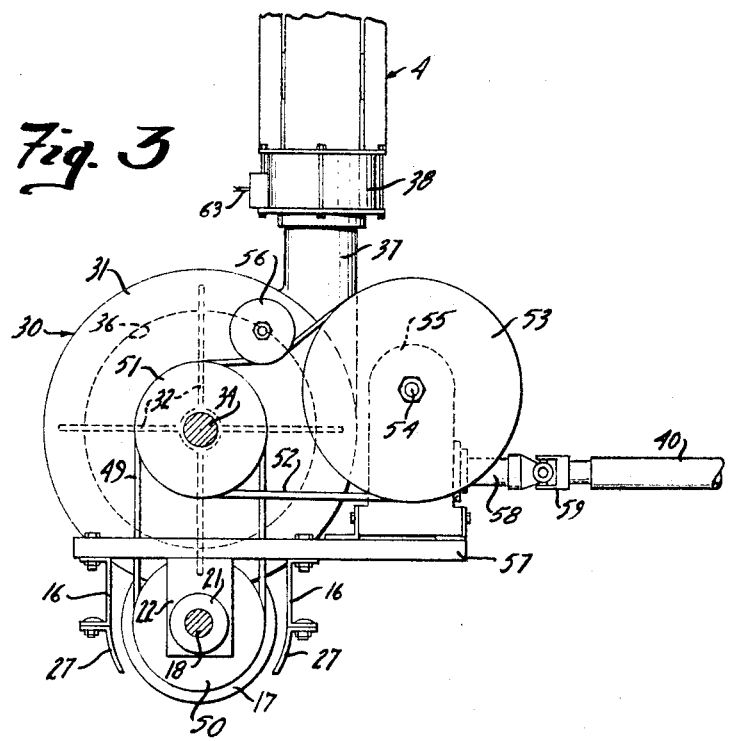
FIG. 3 is a section taken along line 3—3 of FIG. 2.
Figure 4:
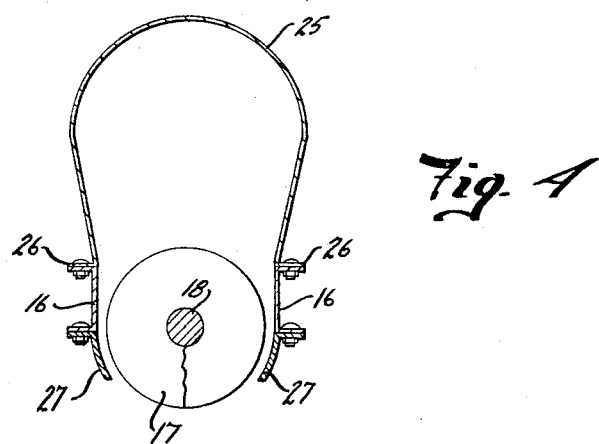
FIG. 4 is a section taken along line 4—4 of FIG. 2.

The auger 17 is enclosed by a generally U-shaped hood 25 having a pair of outwardly extending flanges 26 which are secured by bolts to the upper flange of the channel 16. As best shown in FIGS. 2 and 4, the hood has an inverted U-shaped cross section and the sides of the hood diverge outwardly from the point of connection to the channels 16 so that the central portion of the hood 25 is wider than the lower portion. In addition, the hood slopes or tapers in a longitudinal direction upwardly from a position located adjacent the silo wall to a position located at the inner end of the auger. As shown in the drawings, the upper surface of the hood 25 is shown to be straight. However, it is contemplated that the upper surface of the hood 25 can be slightly curved as well as straight.

In order to accommodate silos of various diameter, the auger 17 and hood 25 can formed in sections. For example, an inner section of standard length can be coupled or joined to outer sections of various lengths. In this situation, the hood of the inner section may have a pitch or slop slightly different from the slope of the outer section, with the difference in slope depending on the length of the outer section. In some cases, a portion, or all of the length of the hood can be straight, without a slope or taper.

The lower portion of the auger 17 is enclosed by a pair of generally curved shrouds 27 having outwardly extending flanges which are connected to the lower flanges of the channels 16 by bolts or the like. As best shown in FIG. 4, the shrouds 27 generally conform to the circular curvature of the auger and terminate a slight distance above the lower extremity of the auger 17. In most operations, the shrouds will terminate approximately ¾ of an inch above the lower extremity of the auger.

To guide the cutter arm 15 in its rotation within the silo, a pair of guide wheels 28 are journalled on a bracket 29 attached to the end of the hood 25 and the wheels are adapted to ride against the wall of the silo. The wheels 28 are adjustably mounted on the bracket 29 so that the wheels can be moved longitudinally and the distance between the cutting knives 24 and the silo wall can be varied as desired.

As the shaft 18 is rotated, the auger 17 will slice through the mass of silage 2 and shred and dislodge the silage. The auger 17 is operated at a high peripheral speed, above 2000 feet per minute, and generally in the neighborhood of 3000 to 3500 feet per minute. For example, a 6 inch O.D. auger rotating at 1750 r.p.m. will produce a peripheral speed of about 3400 feet per minute. The high speed movement of the auger will propel the dislodged silage along the undersurface of the hood 25 as a fast moving stream to the center of the silo.

The silage moving through the hood 25 to the center of the silo is discharged by a centrifugal thrower 30 which is mounted for rotation with the cutter arm assembly 15. The centrifugal thrower 30 includes a housing 31 which is supported on the spaced channels 16. A series of blades 32 are secured edgewise to the face of a disc 33. The disc 33 is secured to shaft 34 which is journaled within a bearing 35 mounted within an opening in the housing 31.

The housing 31 is provided with a large inlet opening 36 which registers with the inner open end of the hood 25. As best shown in FIG. 2, the opening 36 extends radially a substantial distance from the axis of the housing 31, and the blades 32 are provided with curved or arcuate edge portions which extend to the edge of the opening 36.

The housing 31 is also provided with a tangential discharge outlet 37 which is journaled for rotation within a conventional collector ring assembly 38 mounted on the stationary frame 4. The collector ring assembly 38 may be similar to that described in United States Patent 2,794,560.

To drive the cutter arm assembly 15 around the center of the silo, a drive wheel 39 is positioned to the rear, in the direction of rotation of the cutter arm, and is secured to the outer end of a drive shaft 40. A brace 41 connects the housing surrounding the shaft 40 and the outer end of the channel 16. The drive wheel 39 is preferably located in the 90° quadrant behind the cutter arm 15, in the direction of rotation, and rotation of the drive wheel serves to push or drive the cutter arm around the silo.

The drive wheel 39, auger 17, and the blades 32 are all driven by a motor 42 which is mounted on a platform 43 secured to the channels 16. The motor shaft 44 is connected by a coupling 45 to the shaft 34 and serves to drive the disc 33 and blades 32 at a speed corresponding to the motor speed. The shaft 34 is journaled within a bearing 46 mounted on a bearing support 47 which is secured across the channels 16.

A pulley 48 is secured to the shaft 34 and is connected by a belt 49 to a pulley 50 secured to auger shaft 18. A pulley 50 has approximately the same diameter as pulley 48 so that the drive speed ratio between the motor 42 and the auger shaft 18 will be approximately 1:1, and generally within the ratio of 1:2 to 2:1. With this drive ratio, and using a motor of conventional horsepower, the speed of rotation of auger 17, depending on its diameter, will be usually greater than 1000 r.p.m. and preferably in the range of 1500 to 2000 r.p.m. As previously mentioned, the auger diameter and speed of rotation should be correlated to produce a peripheral speed above 2000 feet per minute.

The shaft 34 also carries a pulley 51 which is connected by belt 52 to a pulley 53 secured to the input shaft 54 of a standard worm gear drive unit 55. A tightener pulley 56 is secured to the housing 31 and serves to maintain the proper degree of tension on the belt 51. The worm gear drive unit 55 is mounted on a support 57 which extends laterally from the channels 16.

The output shaft 58 of the worm gear drive unit 55 is connected by a universal joint 59 to the drive wheel shaft 40. Thus, rotation of the shaft 34 will operate through the belt drive 52 and worm gear drive unit 55 to rotate the drive wheel 39 and drive the cutter arm 15 in a rotary path around the silo.

The weight of the motor and drive mechanism is counterbalanced by a counterweight 60 which is adjustably secured on a rod 61 extending outwardly from the rear end of the rotating cutter arm 15.

As best shown in FIG. 2, the motor is connected by power lines 62 to the rotating element of the collector ring assembly 38 and the stationary element of the collector ring assembly is connected by power line 63 to a suitable source of electric power. The collector ring assembly 38 provides an electrical connection between the stationary source of power and the motor which is mounted on the rotating cutter arm 15.

As the cutter arm 15 rotates within the silo, the auger 17 is driven about its own axis at a high rate of speed so that the auger or spiral flighting will slice through and shred silage. Due to the high speed of the auger, a stream of shredded or dislodged silage is propelled inwardly along the undersurface of the hood and through the opening 36 in the centrifugal thrower 30. The blades 32 of the thrower 30 engage the silage and eject it through outlet 37 to discharge chute 11. The high speed auger 17 does not operate in the manner of the normal auger conveyor in the conventional silo unloader, for the spiral flight does not mechanically convey any appreciable amount of silage to the center of the silo. Instead, the auger, because it is rotating at such a high rate of speed, throws the silage upwardly against the hood 25 and moves the silage along the underside of the hood to the housing 31.

The high speed auger slices and shreds the silage and tends to eliminate lumps and other large particles. In addition, the auger is more effective when unloading long, fibrous materials, such as grass silage, and will readily cut through frozen or hard-packed silage.

The drive system for the unloader is simplified over that of a conventional silo unloader in that both the blower and the auger are direct drives from the motor and operate at substantially the same speed as the motor.

Due to the fact that the auger is rotating at such a high rate of speed, the bite of the auger, or depth of penetration of the auger into the silage, is relatively small and the cutter arm can be rotated at a faster rate of speed within the silo. Thus, the power required to rotate the cutter arm is substantially reduced because of the smaller bite and the lesser contact between the auger flighting and the mass of silage.

Figure 5:
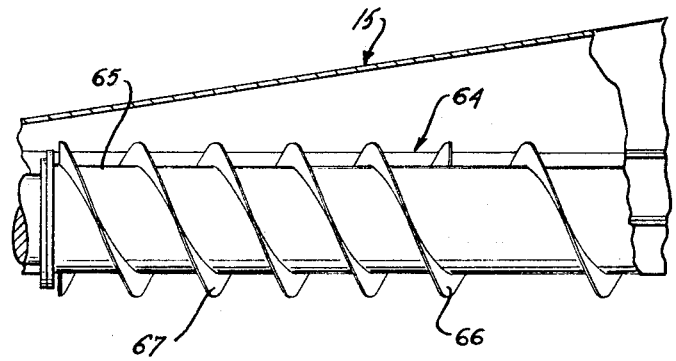
FIG. 5 is a fragmentary longitudinal section showing a modified form of the silage gathering arm.

FIGURE 5 shows a modified form of the invention. In this embodiment, the auger 64, corresponding to auger 17 of the first embodiment, is mounted for rotation within hood 15 in the manner previously described. The auger 64 includes a relatively heavy or thick shaft 65 and a relatively narrow spiral flighting 66 is secured to shaft 65. As the auger 64 is not used to physically convey silage, but instead shreds and dislodges the silage and propels or throws the silage, the peripheral speed of the auger is the important factor rather than the depth of the flighting 66.

In addition, the outer end of auger 64 is provided with a second flighting 67 which aids in removing frozen silage adjacent the silo wall.

Figure 6:
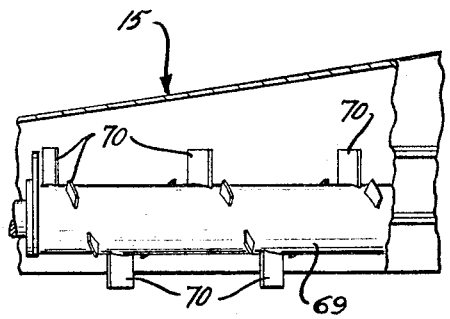
FIG. 6 is a fragmentary longitudinal section showing a second modified form of the silage gathering arm.

FIG. 6 illustrates a second modified form of auger or silage gathering member 68, which includes a shaft 69 mounted for rotation within hood 15 as previously described with respect to shaft 18. Attached to the shaft 69 are a series of angularly disposed paddles or bars 70 which extend radially outwardly from the shaft. Each paddle is positioned at an angle of about 30° to 60°, and preferably about 45° with respect to the axis of shaft 69. The paddles can be positioned randomly along shaft 69, as long as the shaft is dynamically balanced, or they can be arranged on the shaft in spiral or helical form. The paddles function in the manner of the flighting 17 when rotated at a peripheral speed in excess of 2000 feet per minute to dislodge the silage and propel the dislodged silage along the underside of hood 16 and into the opening 36 of the thrower 30.

Various modes of carrying out the invention are contemplated as being within the scope of the following claims particularly pointing out and distinctly claiming the subject matter which is regarded as the invention.

We claim:

1. A silo unloader, comprising a frame; and silage collecting and discharging means journalled in said frame for rotation about the center of the silo, said means including a rotatable member extending radially outwardly from a location adjacent the center of the silo to a location adjacent the silo wall, angularly disposed blade means on said member, a hood substantially enclosing the upper portion of said rotatable member and having an outlet at its inner end, a motor, drive means interconnecting the motor and said rotatable member, said drive means having a drive ratio between the motor and the rotatable member in the range of 1:2 to 2:1 whereby said blade means rotates about the axis of the rotatable member with a peripheral speed in excess of 2000 feet per minute to dislodge the silage and convey the same to the center of the silo for discharge therefrom, and a discharge mechanism disposed at the inner end of the member and having an inlet connected to the outlet of said hood for receiving the dislodged silage and discharging it to the exterior of the silo.

2. In a silo unloader, an auger having its inner end journalled for rotation about a vertical axis substantially at the center of the silo and extending radially outward to a location adjacent the wall of the silo, means for rotating the auger about said vertical axis, silage discharge means disposed adjacent the center of the silo for discharging silage laterally from the silo and having an inlet opening, a hood disposed above the auger and substantially enclosing the auger and having an open inner end communicating with the inlet opening of said discharge means, said hood being spaced from the upper extremity of the auger throughout the length of the auger with the spacing between said hood and the upper extremity of the auger increasing from the outer end of the auger to the inner end, means for rotating the aguer about its axis at a high rate of speed greater than 1,000 r.p.m. to thereby dislodge the silage and propel the silage beneath said hood to said discharge means, and means for operating said discharge means to discharge the silage to the exterior of the silo.

3. In a silo unloader, a shaft having its inner end journaled for rotation about a vertical axis substantially at the center of the silo and extending radially outward to a location adjacent the wall of the silo, blade means on the shaft, means for rotating the shaft about said vertical axis, silage discharge means disposed adjacent the center of the silo for discharging silage laterally from the silo and having an inlet opening, a hood substantially enclosing the auger and having an open inner end communicating with the inlet opening of the discharge means, the upper surface of the hood sloping upwardly from the outer end of the auger to said discharge means, means for rotating the shaft about its axis at a high rate of speed to provide said blade means with a peripheral speed above 2000 feet per minute and thereby dislodge the silage and move the silage beneath the upper surface of the hood to the discharge means, and means for operating said discharge means to discharge the silage to the exterior of the silo.

4. In a silo unloader, an auger having its inner end journaled for rotation about a vertical axis substantially at the center of the silo and extending radially outward to a location adjacent the wall of the silo, means for rotating the auger about said vertical axis, centrifugal thrower means journaled for rotation about a vertical axis substantially at the center of the silo, said thrower means including a housing and a series of blades mounted within said housing for rotation about an axis parallel to the axis of the auger, said housing having an inlet opening extending radially in all directions from said axis, a closure for the auger and extending from the outer end of the auger to the thrower means with the inner end of said closure defining an outlet and being secured to said housing around said inlet opening, said closure being tapered upwardly from the outer end to the inner end, means for rotating the auger about its axis at a peripheral speed greater than 2,000 ft. per minute to cut the silage and convey the silage along the undersurface of the said closure to the thrower means, and means for rotating said blades to discharge the silage to the exterior of the silo.

5. The structure of claim 3 in which the hood has an inverted U-shaped cross section which progressively increases in height from the outer end of the hood to the inner end.

6. In a silo unloader, a supporting structure extending from adjacent the silo wall radially inward beyond the center of the silo, an auger journaled for rotation in the supporting structure and extending from a location adjacent the silo wall to a location adjacent the center of the silo, silage discharge means mounted on the supporting structure adjacent the center of the silo and having an inlet opening therein, a hood carried by the supporting structure and substantially enclosing the auger and having an inner open end communicating with the inlet of said discharge means, a motor mounted on the supporting structure on the opposite side of the center of the silo from the auger, drive means operably connecting the motor and the supporting structure for rotating the supporting structure about the center of the silo, second drive means directly connecting the motor to the auger at a drive ratio of about 1:1 to rotate the auger about its axis with a peripheral speed greater than 2,000 feet per minute, and third drive means directly connecting the motor to the discharge means at a drive ratio of about 1:1.

7. In a silo unloader, an auger having its inner end journaled for rotation about a vertical axis substantially at the center of the silo and extending radially outward to a location adjacent the wall of the silo, means for rotating the auger about said vertical axis, discharge means disposed adjacent the center of the silo for discharging silage laterally from the silo and having a silage receiving portion, a hood having an open inner end communicating with said silage receiving portion of the discharge means, said hood being generally coextensive with the auger and having a generally inverted U-shape with the sides of the hood straddling the auger and the lower portions of the sides of said hood being curved inwardly toward the axis of the auger and terminating a slight distance above the lower extremity of said auger, means for rotating the auger about its axis at a high rate of speed to thereby dislodge the silage and propel the silage beneath the upper surface of the hood to the discharge means, and means for operating said discharge means to discharge the silage to the exterior of the silo.

8. A method of unloading silage from a silo, comprising the step of positioning an auger on the upper surface of the silage in a silo with the inner end of the auger located adjacent the center of the silo and the outer end of the auger located adjacent the wall of the silo, confining the upper portion of the auger with a hood, rotating the auger about the center of the silo, rotating the auger about its axis at a speed sufficient to provide the auger with a peripheral speed greater than 2000 feet per minute to dislodge the silage and propel the dislodged silage along the undersurface of the hood and convey the same to the center of the silo, and discharging the silage conveyed to the center of the silo to the exterior of said silo.

9. A silage collecting and discharge means for a silo unloader, comprising a rotatable shaft mounted for rotation about the center of the silo, blade means on said shaft, a hood substantially enclosing said shaft and having an outlet at its inner end, means for rotating the shaft about its axis to provide said blade means with a peripheral speed greater than 2000 feet per minute, said blade means dislodging the silage as the shaft is rotated and moving the dislodged silage along the underside of the hood in the form of a fast moving stream to the center of the silo, and a discharge mechanism disposed at the inner end of the shaft adjacent the center of the silo and having an inlet opening communicating with the outlet in said hood for receiving the dislodged silage and moving it to the exterior of the silo.

10. The structure of claim 9 in which said blade means comprises a spiral flighting.

11. The structure of claim 9 in which the radius of the shaft is greater than the radial depth of the blade means.

12. The structure of claim 9 in which the blade means comprises a series of separate paddles extending outwardly from the shaft and disposed at an angle of 30 to 60° with respect to the axis of said shaft, said paddles being arranged along said shaft in a manner to provide a dynamic balance for said shaft.

13. A method of unloading silage from a silo, comprising the steps of positioning a shaft having blade means thereon on the upper surface of the silage in the silo with the inner end of the shaft located adjacent the center of the silo and the outer end of the shaft located adjacent the wall of the silo, confining the upper portion of the shaft with a hood, rotating the shaft about the center of the silo, rotating the blade means about the axis of the shaft at a peripheral speed greater than 2000 feet per minute to dislodge the silage and move the same to the center of the silo as a fast moving stream beneath the upper surface of the hood, and discharging the silage from the center of the silo to the exterior.

14. In a silo unloader, a shaft having its inner end journaled for rotation about a vertical axis substantially at the center of the silo and extending radially outward to a location adjacent the wall of the silo, blade means on the shaft, means for rotating the shaft about said vertical axis, silage discharge means disposed adjacent the center of the silo for discharging silage from the silo and having an inlet opening, a hood being substantially coextensive with the shaft and having an inner end communicating with the opening of the discharge means, said hood having a generally inverted U-shape with the sides of the hood straddling the shaft and the lower edges of the sides of said hood terminating at a level below the axis of the shaft and slightly above the lower extremity of said blade means, means for rotating the shaft about its axis at a high rate of speed to thereby dislodge the silage and propel the silage beneath the upper surface of the hood to the discharge means, and means for operating said discharge means to discharge the silage to the exterior of the silo.

15. The silo unloader of claim 14 in which the sides of the hood are curved inwardly toward the axis of the shaft and the lower extremities of both sides of the hood terminate at approximately the same level.

References Cited by the Examiner

UNITED STATES PATENTS

| | | | |
|---|---|---|---|
| 1,695,692 | 12/1928 | Kreisinger | 302—50 |
| 1,954,005 | 4/1934 | Westberg | 302—50 |
| 1,977,312 | 10/1934 | Knapp | 198—213 |
| 2,404,884 | 7/1946 | Pieper | 302—50 |
| 2,717,812 | 9/1955 | Eglitis. | |
| 2,794,560 | 6/1957 | Buschbom | 302—56 |
| 2,801,137 | 7/1957 | Clay | 302—56 |
| 2,864,655 | 12/1958 | Caron | 302—56 |
| 2,963,327 | 12/1960 | Seymour | 302—56 |
| 2,995,260 | 8/1961 | McCann | 302—56 |
| 3,021,620 | 2/1962 | Rosenthal | 198—128 X |

GERALD M. FORLENZA, *Primary Examiner.*

ANDRES H. NIELSEN, *Examiner.*

R. G. SHERIDAN, *Assistant Examiner.*